Aug. 26, 1969    J. C. LINGLE    3,463,415
ELECTRICALLY OPERATED SPIN TYPE FISHING REEL
Filed July 7, 1967    2 Sheets-Sheet 1
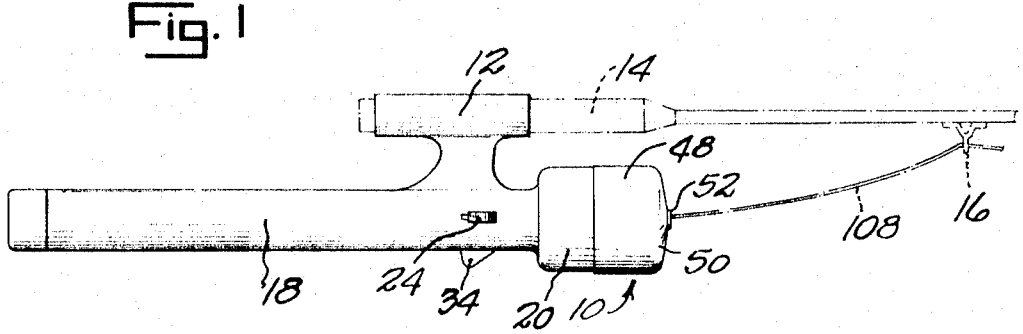
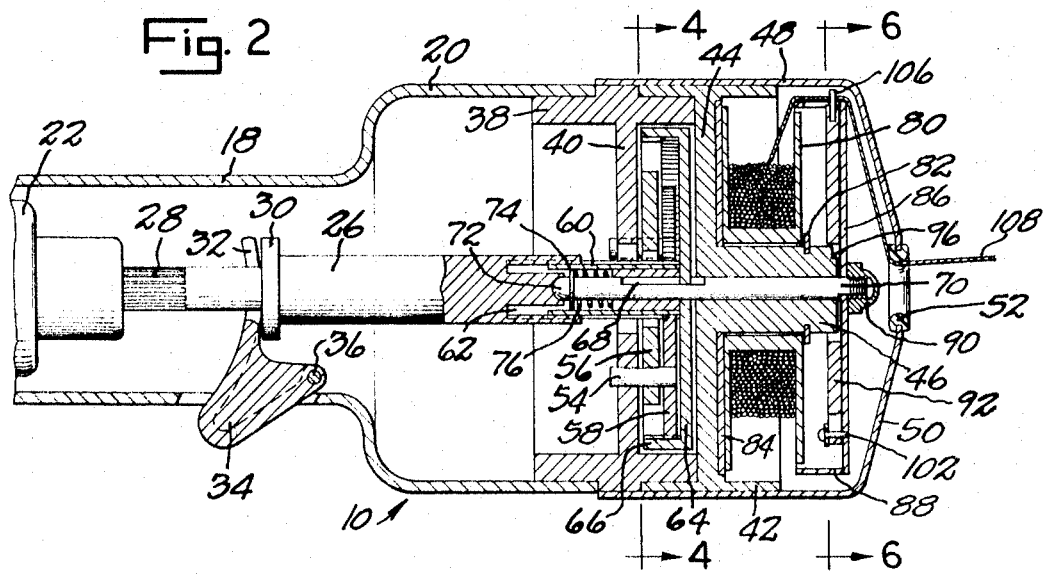
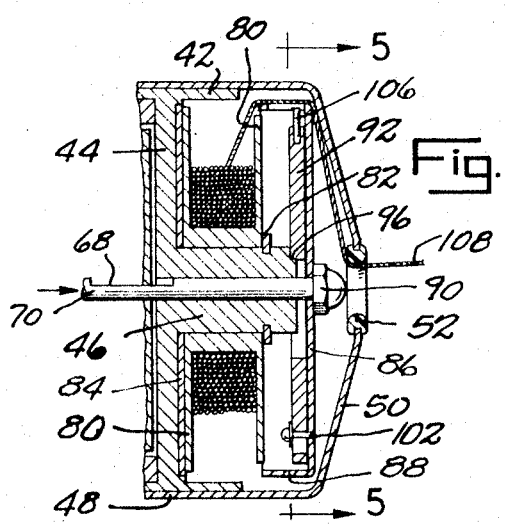
INVENTOR.
JESSE C. LINGLE
BY
Eugene C. Knoblock
ATTORNEY Aug. 26, 1969    J. C. LINGLE    3,463,415
ELECTRICALLY OPERATED SPIN TYPE FISHING REEL
Filed July 7, 1967    2 Sheets-Sheet 2
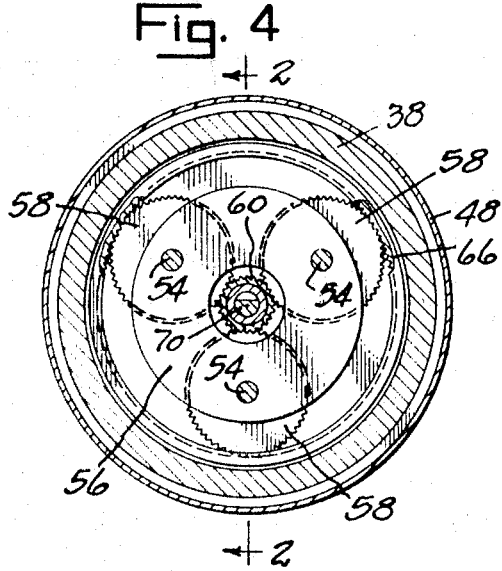
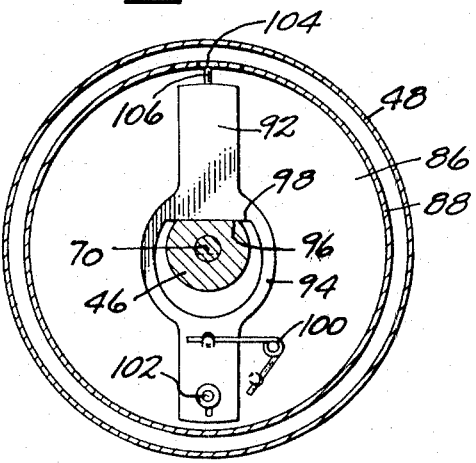
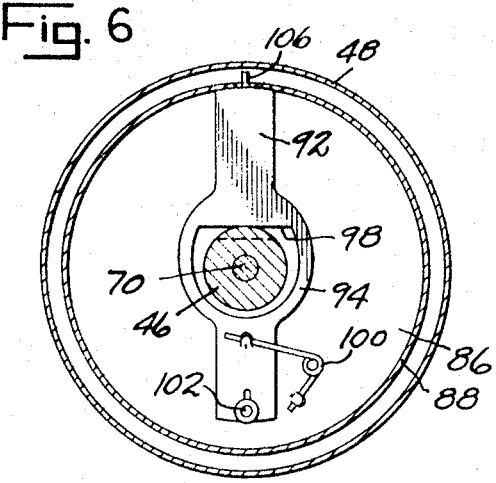
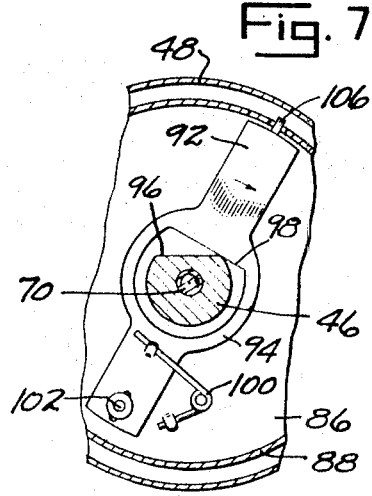
INVENTOR.
JESSE C. LINGLE
BY
*Eugene C. Knoblock*
ATTORNEY 3,463,415
ELECTRICALLY OPERATED SPIN TYPE
FISHING REEL
Jesse C. Lingle, R.R. 1, Box 508,
Coloma, Mich. 49038
Filed July 7, 1967, Ser. No. 651,908
Int. Cl. A01k *89/00*
U.S. Cl. 242—84.2         10 Claims

ABSTRACT OF THE DISCLOSURE

An electrically operated spin type fishing reel having a manual control for a drive motor and a manual actuator for adjusting a multiple part line retrieving mechanism between casting line snubbing and retrieving positions which manual parts are located adjacent each other for selective manipulation by a finger of a user's hand gripping the reel. The drive connection between the motor and the line retrieving mechanism includes gearing which remains in mesh in all operating positions of the device.

---

This invention relates to an electrically operated spin type fishing reel.

Spin type fishing reels of the manually operated type have been widely used. By reason of the manual operation of the reel required to retrieve the line, it is necessary for most users thereof to transfer the reel and the rod on which it is mounted from one hand to the other between casting and retrieving operations, and it is necessary that both hands be used during the retrieving operation. Prior efforts to provide an electrically operated spin type fishing reel have been subject to numerous limitations and disadvantages, such as complicated constructions for effecting engagement and disengagement of gearing, high cost, excessive weight, and likelihood of frequent difficulties in operation. Other problems encountered with prior efforts to produce a motor driven reel have been sacrifice of desired operating characteristics of the reel, such as inability to snub the line as it is being cast as required for accurate casting, or inability to accommodate heavy pulls upon the line during retrieving for the purpose of preventing line breakage.

It is the primary object of this invention to provide a motor driven spin type fishing reel of simple, light weight inexpensive and trouble-free character.

A further object is to provide a reel of this type which can be operated by one hand both to cast and to retrieve a line, and which overcomes the limitations and problems encountered in prior attempts to produce a motor driven reel.

A further object is to provide a motor driven spinning type fishing reel in which the gears between the motor and the line retrieving means thereof remain in mesh at all times and during all phases of operation of the reel.

A further object is to provide a motor driven device of this character by means of which a line can be snubbed during casting as desired by the user.

A further object is to provide a motor driven spin type reel so constructed as to accommodate compensation of retrieving operation thereof incident to variations in the pull exerted on the line by a fish or by an obstacle engaged by a hook carried by the line.

Other objects will be apparent from the following specification:

In the drawings:

FIG. 1 is a side view of my new reel.

FIG. 2 is an enlarged longitudinal axial sectional view of my new reel showing the parts in line-retrieving position, taken on line 2—2 of FIG. 4.

FIG. 3 is a fragmentary axial sectional view similar to FIG. 2, but illustrating the reel in line-snubbing position during casting.

FIG. 4 is a transverse sectional view taken on line 4—4 of FIG. 2.

FIG. 5 is a transverse sectional view taken on line 5—5 of FIG. 3.

FIG. 6 is a transverse sectional view taken on line 6—6 of FIG. 2.

FIG. 7 is a fragmentary sectional view illustrating the line pickup mechanism at an intermediate position between the positions illustrated in FIGS. 5 and 6, as occurs at the commencement of the line-retrieving operation.

Referring to the drawings which illustrate the preferred embodiment of the invention, the numeral 10 designates my new spin type reel having suitable means 12 for mounting the same upon a fishing rod 14 of any suitable construction, and preferably provided with the usual line guide means 16.

My new reel includes an elongated housing portion 18 terminating in an enlarged cup-shaped end part 20. Housing 18 mounts an electrical drive motor 22 and storage batteries (not shown) connected to the motor for powering the same. Operation of the motor 22 is controlled by a suitable switch having a suitable trigger or actuator 24 carried by housing part 18, preferably adjacent the forward end thereof.

The drive motor 22 actuates a longitudinally or endwise adjustable drive shaft 26 which preferably includes a splined part 28 engaging and slidable axially of the motor rotor (not shown). Shaft 26 includes a concentric enlargement 30 intermediate its end providing a shoulder or abutment against which bears the bifurcated end portion 32 of a trigger member 34 pivoted at 36 to the housing part 18 adjacent to the switch trigger or actuator 24. The bifurcated part 32 of the trigger member has a convex surface engaging the enlargement 30. Spring means hereinafter described, may be associated with the drive shaft 26 to normally urge it endwise to the line-retrieving position illustrated in FIG. 2.

The end 20 of the housing mounts a gear carrier which preferably includes a cylindrical part 38 removably anchored in the open end of part 20 and projecting therefrom. Part 38 mounts an inwardly projecting concentric annular part 40. The cylindrical part 38 of the gear carrier preferably projects from housing part 20 and in turn carries a cylindrical part 42 of a spool carrier having an inwardly projecting annular part 44 and an axially outwardly projecting tubular part 46. A shroud or end member has a cylindrical part 48 releasably mounted upon parts 42 and 38 and a conical end wall 50 having a central line discharge aperture at which is preferably mounted a line-engaging annulus 52.

The annular part 40 of the gear carrier mounts a plurality of equi-spaced equi-angularly related longitudinal parallel shafts 54, preferably three in number, which project forwardly therefrom and mount a carrier ring 56, and also mount planet gears 58. Planet gears 58 mesh with the external teeth upon a tubular gear member 60, the teeth of which extend longitudinally. The drive shaft 26 has an elongated concentric groove in the forward end thereof, which groove is splined and receives the tubular member 60 for drive connection therebetween and accommodates endwise movement of guide shaft 26 relative to gear 60. The tubular member 60 abuts and is relatively rotatable with respect to the disk or end wall 64 of an internally threaded ring gear 66 with which the planet gears 58 mesh. Gear end wall 64 has a splined and slidable connection at 68 with a line pick-up shaft 70 which is journaled in the tubular part 46 of the spool carrier and projects therefrom at its opposite ends. Spline 68 is formed on the rear projecting end of shaft 70. Shaft 70 projects freely into the tubular member 60 for abutment at 72 with the outer end of shaft 26.

Shaft 70 is normally maintained in engagement with shaft 26 by spring means. Thus, as best illustrated in FIG. 2, shaft 72 may mount an abutment, such as a washer 74 which is engaged by a coil spring 76 encircling shaft 70 and fitting within tubular gear member 60. The forward end of spring 76 abuts a sleeve 78 within gear 60 which sleeve preferably abuts the ring gear disk 64. Coil spring 76 may be strong enough to normally urge the shaft 70 and the drive shaft 26 to their line-retrieving position as illustrated in FIG. 2.

A line spool 80 encircles the tubular spool carrier part 46, being held by suitable retainer means 82 in abutment with a friction disk 84 carried by annular part 44 of the spool carrier so as to resist rotation of the spool 80 until a rotating force of at least a predetermined value is exerted upon the spool.

The outer projecting end of shaft 70 mounts line pickup means. The line pick-up means includes a rotor consisting of a disk 86 and a rearwardly extending cylindrical peripheral portion 88 adapted to encircle a part of the spool 80 with clearance. Part 88 also has clearance within the cylindrical part 48 of the shroud or end member of the housing. Disk 86 is fixedly secured to the end of line pickup shaft 70 by any suitable means, such as a spline connection with said shaft and a retaining nut 90 threaded on the shaft.

A transversely extending elongated member 92 is mounted upon the disk 86 of the rotor member by suitable guide means to guide its movement transverse of the rotor. Transverse member 92 is preferably provided with a central yoke portion 94 adapted to encircle with clearance a projecting or end portion of the tubular part 46 of the spool carrier. The end of the tubular part 46 of the spool carrier is formed to provide a cam at 96 as by means of a cut-away at one side thereof as illustrated in FIGS. 2, 5 and 7. The yoke part 94 of member 92 has a mating transverse surface 98 adapted to seat on the cam surface 96 in one position of the parts as illustrated in FIGS. 3 and 5 as urged by a spring 100 carried by the disk 86. Suitable guide means, such as a pin and slot arrangement 102, co-operates with yoke 94 to guide the transverse movement of the member 92 during operation of the reel. The cylindrical portion 88 of the line pick-up rotor has an aperture 104 aligned with the transverse member 92, and the end of the transverse member 92 carries a line pick-up pin 106 adapted to be projected through the aperture 104 as illustrated in FIG. 6 and 7 to assume a line-retrieving position.

In the operation of the device, assuming that the line has been retrieved or wound upon the reel and that the user is ready to make a cast, the user holds the trigger 34 in shaft-advancing position while the motor 22 is stationary and during the casting manipulation of the rod. Thus, the shaft 26 of the motor and the line pick-up shaft 70 are projected outwardly endwise from the position shown in FIG. 2 to the position shown in FIG. 3, said movement occurring against the action of the spring 60. Thus, endwise movement of the line pick-up shaft 70 occurs relative to the disk 64 of the planet gear 66 without disengagement of those parts during casting. The endwise outward movement of the line pick-up shaft 70 during the cast is sufficient to shift the transverse member 92 to a position clear of and beyond the outer end of the tubular part 46 of the spool carrier so that the transverse member 92 is free to move under the influence of spring 100 from a position in which pick-up pin 106 is projected in line engaging position as seen in FIGS. 2 and 6 to the position in which the line pick-up pin 106 is retracted into the rotor as illustrated in FIGS. 3 and 5. While the parts are in this casting position the line 108 encircling the spool 80 is unwound therefrom and is fed around the rotor and out of the reel housing through the line engaging annulus 52 in response to the force of the casting movement of the rod or pole 14.

As the lure (not shown) carried by the end of the line 108 approaches the target area in which the user desires it to be cast, the user increases pressure upon the trigger 34 to the extent required to affect a snubbing action upon the line 108 between the line pick-up rotor 86, 88 and the conical end wall 50 of the reel housing as illustrated in FIG. 3. This retards or snubs the payout or unreeling of the line and facilitates the accuracy of casting in a manner comparable to the action of applying thumb pressure to a casing reel of the spool type in the manner well known by fishermen. It will be understood, of course, that thumb pressure will be applied to the trigger 34 continuously from the start of the casting operation until the lure on the line strikes the water. At that time the user releases pressure from the trigger 34 to permit the longitudinal positioning action of spring 76 upon motor shaft 26, and the line pickup shaft 70 to occur. It will also be understood that any tendency of the line pick-up rotor 86, 88 to rotate incident to the casting operation is retarded by virtue of the tendency of the transverse member 92 of the line pick-up assembly to seat on the cam 96 of the tubular part 46 of the spool carrier at its cam mating yoke surface 98 in a manner illustrated in FIGS. 3 and 5.

When the user wishes to retrieve the line, he operates the switch actuator 24 to activate the drive motor 22 for the purpose of rotating the shaft 26. When the manually operable parts 24 and 34 are positioned adjacent each other as illustrated in FIG. 1, it will be apparent that the user can operate either of said parts 24 or 34 at will without releasing his grip upon the reel housing part 18 which preferably serves as a handle. It will be understood, however, that if desired, the fishing rod or pole 14 may be provided with a handle which is gripped and which is so positioned that a finger of the gripping hand may selectively activate either of the members 24 or 34.

As the operation of the motor 22 produces rotation of shaft 26, this shaft in turn rotates or drives the tubular gear member 60 with which the planet gear 58 mesh, and the rotation of these gears 58 serves to rotate the internally threaded ring gear 66 with which the planet gears mesh, so as to effect rotation of the line pick-up shaft 70 through the spline between the ring gear and the line pickup shaft 70. Thus, rotation of motor shaft 26 is tranmsitted to line pickup shaft 70 and to the line pick-up rotor 86, 88. The rotation of line pickup rotor 86, 88 occurs relative to spool 80 and to the tubular part 46 of the spool carrier and to the cam surface 96, and carries with it the transverse pick-up member 92 and the line pickup pin 106. As a result of this relative rotation, the engagement of the cam-mating yoke surface 98 with the cam surface 96 of the tubular part 46 of the spool carrier which is illustrated in FIG. 5 is altered, and the surface 98 of the yoke starts to climb out of engagement with the cam surface 96 as illustrated in FIG. 7. After a predetermined angle of travel the yoke surface 98 contacts the cylindrical surface of the tubular part of the spool carrier 46 to free the pickup rotor 86, 88 and shaft 70 for inward endwise movement by the spring 76 until the rotor 86 abuts or approaches contact with the end surface of the tubular part 46 and the end 72 of shaft 70 abuts the end of shaft 26.

The action just described entails endwise movement of the member 92 against the action of the spring 100 in a direction to project the line pick-up pin 106 through the rotor aperture 104 to the line-retrieving position illustrated in FIG. 6. It will be observed from FIGS. 2 and 3 that the thickness of the part 92 is greater than the depth of the cam forming cut-away 96 on the member 46, so that the inward movement of rotor part 86 of the line-retrieving means will cause the yoke surface 98 to engage the periphery of the tubular part 46 inwardly of the cam forming notch or cut-out 96 so as to hold the line-retrieving pin 106 in the projected retrieving position illustrated in FIGS. 2 and 6 while rotation of the motor 22 continues. It will be understood that the retrieving operation under the power supplied by the drive motor 22 will continue as long as the switch actuator 24 remains in "on" position and serves to rotate the line pick-up rotor member 86, 88 and the pick-up pin 106 relative to the spool 80 to wind the line 108 upon the spool 80.

It will be observed that the tubular gear member 60 retains its splined engagement with motor shaft 26 during both casting and retrieving operations, that planet gears 58 mesh with tubular member 60 and with ring gear 66 during casting and retrieving and that the disk 64 of ring gear 66 retains its splined driving connection with pick-up shaft 70 during both casting and retrieving operations. By virtue of this arrangement the device is ready at all times to effect rewinding operation of the line as soon as the motor is energized. At the same time, the meshing gear parts serve the additional function of retarding rotation of the line pick-up rotor during the casting operation and also following the retrieving operation and before the next casting operation.

One additional characteristic of the operation of the device is the mounting of the spool 80 in a manner to permit rotation thereof as retarded only by the functioning of the friction disk 84 against which one end wall of the spool 80 abuts. As a result of this arrangement, if the pull exerted upon the line by a fish or as a result of engagement of a hook with an obstacle during retrieving increases while the motor 22 is operable to rotate the line retrieving parts 86, 88 and 106, this increased tension is transmitted by the line and the rotating line retrieving means to the spool 80 to rotate that spool against action of the rotation resisting friction disk 84. It will be apparent that the parts may be so proportioned as to regulate the amount of torque tending to produce rotation of the spool which friction disk 84 will resist or restrain. Thus, it is possible to correlate this friction with the strength of the line 108 to insure that rotation resistance will have a value less than the strength of the line 108, so that breakage of the line 108 due to application of excessive tension thereon is eliminated.

It will be apparent from the foregoing description that this device is of simple construction made from parts which can be fabricated and assembled easily and quickly, and it utilizes a minimum number of parts so as to maintain the weight of the unit at a small value which insures practicability of the device and its manipulation or use without tiring the user. The parts can be made inexpensively of requisite strength to insure a long useful life of the unit and trouble-free operation. Of equal importance is that fact that the device retains casting control line-snubbing or braking, and also retains rapid and assured line pickup adjustment and line casting adjustment, so that all of the desired functions of a conventional spinning reel are accomplished. At the same time the device offers the advantages of power operated line retrieval and one-handed operation through selection of one or the other of the operation controlling triggers or actuators 24 and 34.

While the preferred embodiment of the invention has been illustrated and described, it will be understood that changes in the construtcion may be made within the scope of the appended claims without departing from the spirit of the invention.

I claim:

1. A motor driven spin type fishing reel, comprising
a housing containing a drive motor having an axially shiftable shaft,
a line spool enclosed in said housing,
a rotatable line retrieving means, including a second axial shaft shiftable endwise in said housing and normally abutting said first shaft,
axially stationary planetary gearing interconnecting said motor shaft and said second shaft in all operating positions,
manually actuated means carried by said housing for shifting said shafts longitudinally from a normal position to a forward position,
said line retrieving means including a rotor and a spring urged transversely shiftable part projecting from said rotor to line-engaging position when said second shaft is in normal position and retracted in said rotor to a line-releasing position when said second shaft is in forward position,
and cam means in said housing engaged by said transversely shiftable part when said second shaft is in forward position and operative upon rotation of said second shaft to project said transversely shiftable part to line-engaging position.

2. A fishing reel as defined in claim 1, wherein
said line spool is journaled in said housing substantially coaxially of said line retrieving member, and
friction means restrains said spool against rotation by force below a predetermined valve.

3. A fishing reel as defined in claim 1, and
motor control means having a manually actuated part carried by said housing adjacent said shaft shifting means.

4. A fishing reel as defined in claim 1, and
manually actuated motor control means located on said housing near said shaft shifting means whereby both of said means are selectively engageable by a user by manipulation of a finger of his hand which holds said reel.

5. A fishing reel as defined in claim 1, wherein
said axially shiftable motor shaft is formed of two telescopically interfitting splined relatively longitudinally shiftable parts,
said shaft shifting means engaging one of said telescopic parts,
said gearing including a gear meshing with the other telescopic part and a gear slidably splined to said second shaft.

6. A fishing reel as defined in claim 1, and
spring means urging said motor shaft and second shaft toward normal position.

7. A fishing reel as defined in claim 1, wherein said planetary gearing includes
a ring gear,
a plurality of planet gears meshing with and within said ring gear, and
a pinion gear arranged centrally of and meshing with said planet gears,
said motor shaft having a splined and axially slidable connection with said pinion gear, and
said second shaft having a splined and axially slidable connection with said ring gear.

8. A fishing reel as defined in claim 1, wherein
said planetary gearing having a central gear with which said motor shaft has a splined and slidable connection and a ring gear with which said second shaft has a splined and slidable connection.

9. In a motor driven spin type fishing reel having a housing with a central line opening at one end, a normally stationary line-winding spool in said housing, and an axially shiftable rotatable line pick-up unit including a line pick-up member radially spring urged to a retracted position upon endwise movement of said unit from normal operating position and cam-projected to a line-engaging position upon rotation of said unit, the improvement comprising
an axially shiftable motor driven shaft in said housing and abutting the rear end of said line pickup unit,
manually operable means on said housing for shifting said shaft axially, and
axially stationary planetary gearing in said housing including parts respectively having sliding driving connections with said shaft and line pick-up unit.

10. A fishing reel as defined in claim 9, and
a drive motor in said housing and
a manually operable motor control carried by said housing adjacent said shaft shifting means,
said manually operable parts being positioned to be selectively operated by a finger of the hand of a user by which the reel is held.

References Cited

UNITED STATES PATENTS

| | | |
|---|---|---|
| 3,018,979 | 1/1962 | Clickner. |
| 3,116,892 | 1/1964 | Pickard. |
| 3,248,819 | 5/1966 | Stealy. |
| 3,351,300 | 11/1967 | Nagy. |

BILLY S. TAYLOR, Primary Examiner